United States Patent [19]

Arnaud

[11] 3,977,188

[45] Aug. 31, 1976

[54] FLUID INJECTING DEVICES IN AN INTERNAL COMBUSTION ENGINE

[75] Inventor: Henri Arnaud, Cerny, France

[73] Assignees: Automobiles Peugeot, Paris; Regie Nationale des Usines Renault, Boulogne-Billancourt, both of France

[22] Filed: Jan. 2, 1975

[21] Appl. No.: 538,297

[30] Foreign Application Priority Data

Jan. 7, 1974 France .............................. 74.00480

[52] U.S. Cl. .............................. 60/304; 123/32 VN
[51] Int. Cl.² ........................ F01N 3/10; F02B 3/00
[58] Field of Search .......... 123/32 VN; 60/304, 305, 60/294; 123/26

[56] References Cited

UNITED STATES PATENTS

| | | | |
|---|---|---|---|
| 3,147,588 | 9/1964 | Tauschek | 60/294 |
| 3,742,712 | 7/1973 | Garcea | 60/294 |
| 3,759,040 | 9/1973 | Peltomaki | 60/305 |

FOREIGN PATENTS OR APPLICATIONS

| | | | |
|---|---|---|---|
| 1,576,787 | 7/1967 | Germany | 60/305 |

*Primary Examiner*—Charles J. Myhre
*Assistant Examiner*—Ronald B. Cox
*Attorney, Agent, or Firm*—Beveridge, DeGrandi, Kline & Lunsford

[57] ABSTRACT

An improved apparatus for injecting fluid into an internal combustion engine includes a fluid conduit in the engine's cylinder head for discharging fluid into the zone of the valve head. The fluid conduit outlet is positioned so that when the valve is in the seated or closed position, the outlet is substantially closed, and when the valve is in the open, unseated position, the outlet is open, thereby permitting a substantial flow of fluid through the conduit only when the valve is open.

7 Claims, 8 Drawing Figures

FLUID INJECTING DEVICES IN AN INTERNAL COMBUSTION ENGINE

BACKGROUND OF THE INVENTION

1. Field of the Invention

This invention relates to a fluid injection device and more particularly to fluid injection devices for use in internal combustion engines.

2. Description of the Prior Art

In internal combustion engines it is the current practice to inject fluid either at the inlet, in the form of fuel or combustion-supporting agents, or at the exhaust, where the injection as a rule takes the form of the admission of air for the after-combustion of the exhaust gases to reduce their pollution. Air injection at the exhaust, used on its own or in addition to catalysis systems, is one of the means used to reduce harmful emissions at the exhaust by oxidizing carbon monoxide and unburned hydrocarbons. It enables engines to run with levels of richness above 1, thus assisting high performance and also substantially reducing nitrogen oxide.

In the prior art systems air flow is independent of the phases of the cycle for each cylinder. Being essentially a function of the rotation conditions of the air pump, it is, if necessary, regulated globally for all cylinders in certain operational conditions (starting from cold, full load, etc.).

Among the fluid injection devices comprising conduits or channels discharging into at least one of the inlet or exhaust pipes of each engine cylinder, devices are known in which the fluid is injected at the level of the stop shoulder by which the valve seat is fitted into the cylinder head. Devices are also known in which the fluid is injected by means of the valve guide, either outside the latter between a portion of its fitting into the cylinder head and the cylinder head itself, or inside such guide, by means of a constriction of the diameter of a portion of the valve stem.

A serious disadvantage of these devices is that the fluid is injected at a relatively considerable distance from the valve head. Consequently, the valve head is not cooled in an optimum manner by the fluid, and fluid injection is not associated with the cyclic opening and closure phases of the valve. For each cylinder, the injection of a fluid such as air is continuous, while reaction with the gases leaving the cylinder can take place only during the exhaust phase — i.e. one quarter of the engine cycle. During the three other phases — i.e. three quarters of the cycle — not only does the air flow fail to produce any further reaction, but produces a cooling which is prejudicial to the required effect. In view of this fact, selected of the air flow in this case is the result of a compromise between combustion efficiency during the exhaust phase and the risks of excessive cooling during the remainder of the engine cycle, so that the effect of after-combustion cannot be exploited to the maximum potential.

Moreover, in the prior art method last cited, there is a risk that the guidance and durability of the valve may be adversely affected by the intended reduction in the section of its stem, where a breakage can start.

SUMMARY OF THE INVENTION

The fluid injection device according to the present invention enables the fluid to be injected cyclically for each cylinder in synchronization with the opening movements of the valve via which injection is performed.

The advantage obtained, for instance, by the cyclic injection of air at the exhaust, consists in obtaining improved efficiency of the after-combustion effect and a more efficient and rational utilization of the air flow which is injected into the zone in which the temperature is very high.

The fluid injection device according to the invention comprises an injection conduit discharging into the opening zone of an internal combustion engine valve, the opening of the injection conduit being substantially closed by that portion of the valve in the zone connecting the valve head to its stem when the valve is in the closed position, so as to produce an injection of fluid into the opening zone of the valve only when it is in the open position.

A slight clearance left between the opening of the injection conduit and the portion of the zone connecting the head of the valve to its stem in the open position prevents the valve from being accidentally lifted off its seat by the pressure of the injection fluid in the conduit.

In one embodiment of the invention, the fluid injection conduit is disposed in the cylinder head of the engine in plane containing the axis of the valve, and the opening of the conduit discharges the air generally radially at the level of the tulip-shaped profile of the valve when it is in the closed position.

In a second embodiment of the invention, which is an improvement of the first embodiment, the fluid injection conduit provided in the cylinder head of the engine and has its discharge outlet offset in relation to the axis of the valve, the opening of the conduit discharging generally tangentially at the level of the tulip-shaped profile of the valve when it is in the closed position. This position of the conduit in relation to the tulip-shaped profile of the valve produces an eddying effect on the fluid which encourages a certain amount of the injected fluid to enter the combustion chamber of the engine when the valve is in the open position.

In a third embodiment of the invention the fluid injection conduit is provided in the valve guide. The valve guide, whose body is adapted to guide a conventionally designed valve with a smooth stem, comprises as a continuation of such body and unitary therewith, a hollow skirt concentric with the valve stem and cooperating with the valve stem to form the injection conduit. The hollow skirt, which has an inside diameter larger than the guided diameter of the valve stem, has a free end, opposite from the guide body, which is shaped to be substantially flush with the tulip-shaped profile of the valve head in the valve closure position, so that the fluid entering the skirt, via an aperture disposed at the level of its connection to the valve guide body, is channeled by the skirt along the valve stem as far as the valve head, so as to be injected only when the valve is in the open position.

In a fourth embodiment of the invention, forming an improvement of the preceding embodiment, the valve guide forming the fluid injection conduit is associated with a valve comprising, at the level of the zone connecting its head and stem, a cylindrical shoulder continued on the valve stem side by an assembly of ribs. The cylindrical shoulder has an outside diameter slightly smaller than the inside diameter of the valve guide skirt, so that the shoulder closes the end of the skirt, in the valve closure position, taking the place of the tulip-shaped profile of the valve head. This configuration is less constraining than the preceding one from the point of view of manufacturing tolerance, since the tulip-shaped profile of the valve head no longer needs to contact the end of the valve guide skirt, thus obviating the risk of such contact occurring before the valve was resting on its seat, and thus preventing the valve from closing completely.

Conversely, in the valve closure position the cylindrical shoulder can slightly enter the valve guide skirt and this, combined with the use of the ribs, produces very satisfactory valve guidance, preventing the valve from "whipping" in operation. The entry of the cylindrical shoulder into the valve guide can be judiciously calculated and used to ensure a delay in fluid injection when the valve is open, or else an advance in the interruption of such injection when the valve is closed. This special shaping of the valve thus ensures that, when air is injected at the exhaust, air injection stops before the complete closure of the exhaust valve, air being prevented from entering the combustion chamber, thus increasing the rate of emission of nitrogen oxide, during the closure crossing of the inlet and exhaust valves.

The cylindrical shoulder and the ribs adjacent thereto can be directly formed on the valve when it is manufactured. This element can be formed by a ring disposed on the valve stem at the level of its connection to the valve head. In any case, this special shaping of the valve, which can be effected without great difficulty, never causes any risk of weakening the valve and on the contrary can only reinforce it as a result of the combined presence of the ribs and the cylindrical shoulder, which give it a locally increased cross-section.

A fraction of the fluid continuously injected inside the guide valve skirt may tend to escape, more particularly during the periods of closure of the skirt by the valve, as a result of pressure, along the valve stem, thus driving the lubricant disposed between the valve stem and the guide towards the top of the cylinder head, and this may cause a risk of the valve seizing up. A device forming a leakage labyrinth can therefore be provided inside the body of the valve guide, slightly above the top part of the skirt, so as to collect that fraction of the fluid which tends to escape along the valve stem and to channel it in the direction of any corresponding inlet and/or exhaust pipes of the engine.

The fluid injection device therefore enables fluid injection to be synchronized very simply and cheaply in dependence on the opening and closure cycle of the corresponding valve.

The injected fluid also has the advantage of cooling the valve by heat exchange, thus having a very appreciable favorable effect on valve life. The heat exchange takes place continuously, since during the valve closure phase a slight leakage must exist between the free end of the injection conduit and the zone of connection between the valve head and stem to assure that the valve bears correctly against its seat.

The latter aspect also facilitates the manufacture of the injection conduits by calling for less precise machining as regards the length of the conduit and the profile of its free end. The fluid injection device according to the invention can be used in association with both the inlet valve and exhaust valves of internal combustion engines.

They can be applied, among other things, to the injection of fuel-supporting agent (more particularly air) or fuel (for instance, in gaseous form) at the inlet, or to the injection of after-combustion air for the exhaust gases.

BRIEF DESCRIPTION OF THE DRAWINGS

Other features and advantages of the invention will become apparent from the following description of embodiments of fluid injection devices for internal combustion engines, with reference to the accompanying drawings, wherein.

DESCRIPTION OF THE PREFERRED EMBODIMENTS

Figure 1:
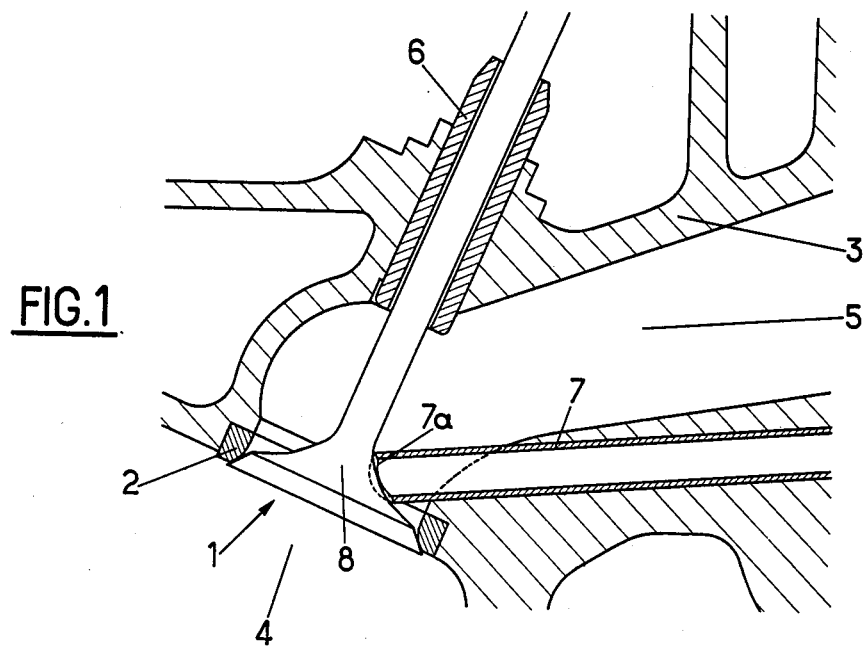
FIG. 1 is a sectional view of a portion of an internal combustion engine cylinder head having an injection conduit according to a first embodiment of the invention, discharging radially at the least of the tulip-shaped part of the valve, which is shown in the closed position.

In the first embodiment (FIGS. 1 and 2) a conventionally constructed exhaust valve 1 is normally returned by a conventional means (not shown) to bear against the seat 2 on a cylinder head 3 in the closure position of the valve 1 (FIG. 1), to close communication between a combustion chamber 4 and an exhaust manifold 5. The valve 1 is guided in traversing and rotary movement inside the cylinder head 3 by a valve guide 6 fitting in known manner into the cylinder head 3.

Figure 2:
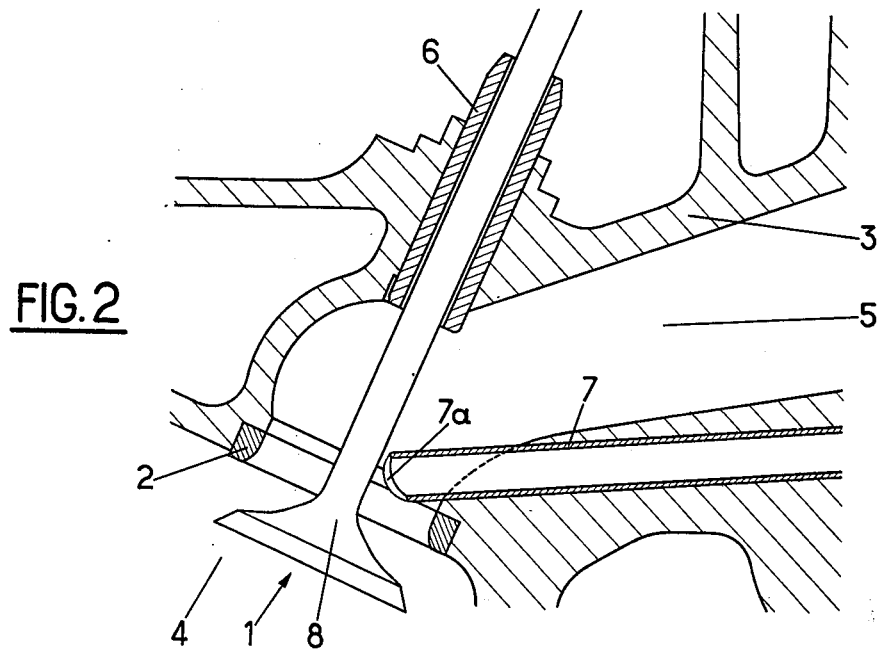
FIG. 2 is a view similar to FIG. 1 with the valve being shown in the open position.

A fluid injection conduit 7 is fitted into the cylinder head 3 and has an aperture 7a which is flush with the tulip-shaped profile of the head 8 of the valve 1 in closure position of the valve on its seat 2 (FIG. 1). In the embodiment illustrated in FIGS. 1 and 2 the conduit 7 is disposed in a plane axial in relation to the valve 1.

Figure 3:
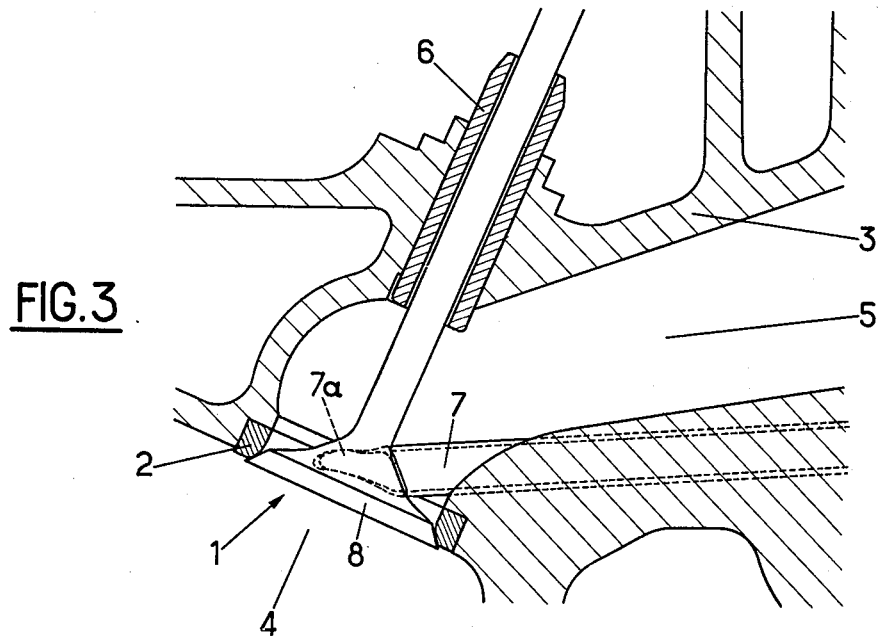
FIG. 3 is a view similar to FIG. 1 and illustrating a second embodiment of the invention in which the fluid injection conduit discharges tangentially at the level of the tulip-shaped member of the valve, which is shown in the closed position.
Figure 4:
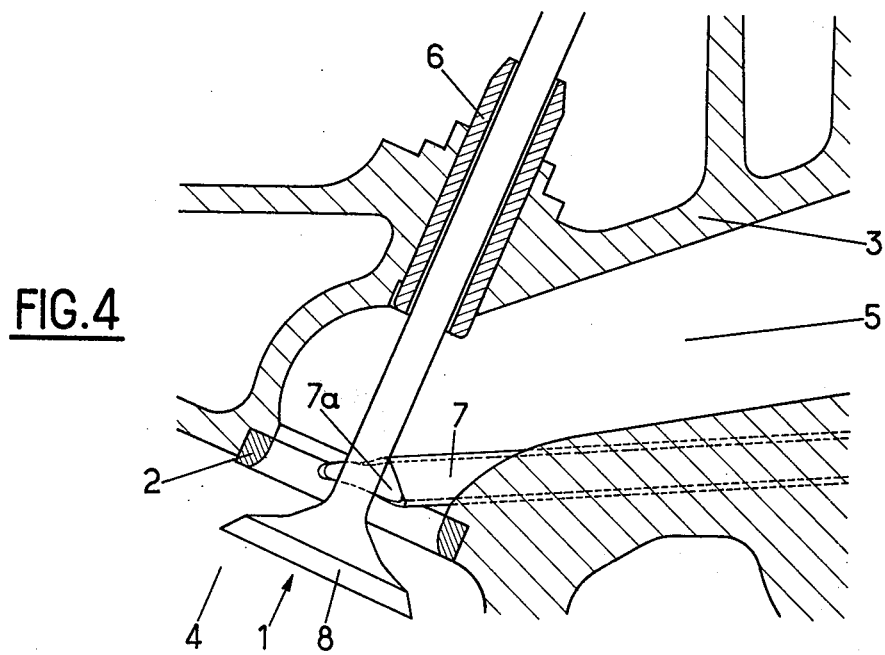
FIG. 4 is a view similar to FIG. 3, and showing the valve in the open position.

In the second embodiment (FIGS. 3 and 4) the fluid injection conduit is not disposed in a plane axial in relation to the valve, with the opening of the conduit offset from the valve axis and discharging tangentially at the level of the tulip-shaped part of the valve when it is in its closed position. With this arrangement fluid injection is less impeded by the presence of the valve stem.

In the third embodiment (FIG. 5) the exhaust valve 1 is again returned to bear against its seat 2 in cylinder head 3 in the closure position of the valve 1, to close communication between the combustion chamber 4 and the exhaust pipe 5. In this embodiment the valve 1 is guided in traversing and rotary movement inside the cylinder head 3 by valve guide 9. The valve guide 9 is a cylindrical body 10 fitting in known manner into the cylinder head 2 and continued by a skirt 11 coaxial with the valve 1.

The body 10 acts as a guide for the stem 12 of the valve 1. The skirt 11, which has an inside diameter larger than the guide diameter of the stem 12, fits flush via its free end, opposite from the body 10 and shaped for this purpose, with the tulip-shaped profile of the head 8 of the valve 1 in the closure position of the valve 1 on its seat 2. An annular injection conduit 13 is thus formed between the skirt 11 and the stem 12 of the valve 1.

A channel 14 in the cylinder head 3 connected to the delivery of an air pump (not shown) supplies compressed air, via an aperture 15 in the skirt 11 of the guide 9, substantially at the level of connection with the body 10, to injection conduit 13 lying between the inner wall of the skirt 11 and the stem 12 of the valve 1.

Figure 5:
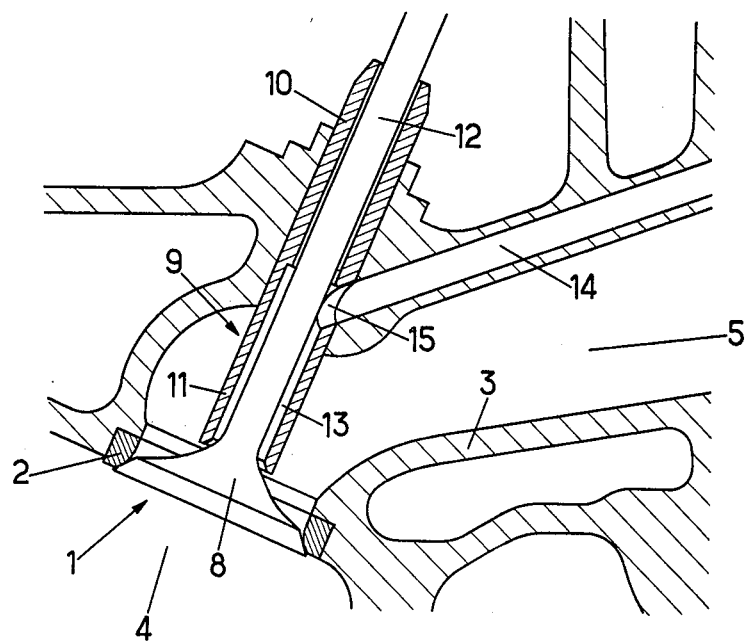
FIG. 5 is a sectional view of a portion of an internal combustion engine cylinder head having a valve guide forming an injection conduit in a third embodiment of the invention.
Figure 6:
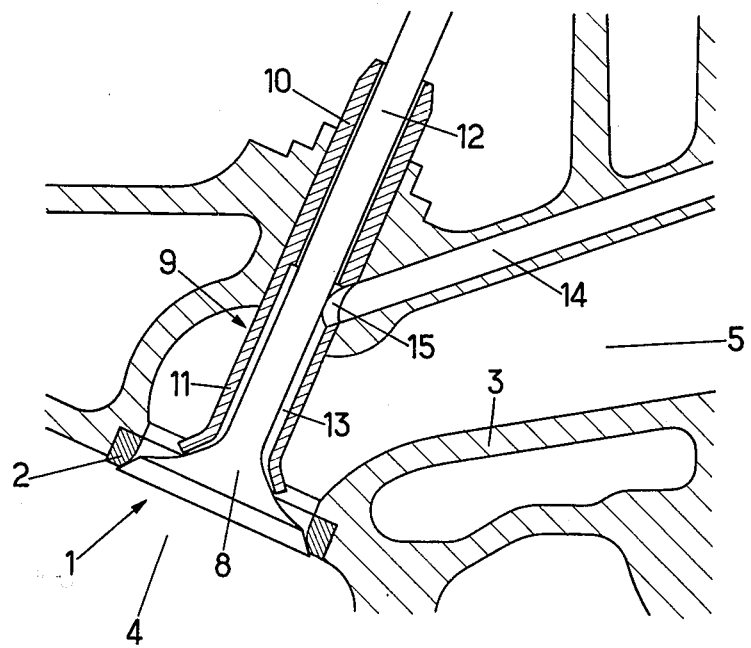
FIG. 6 is a variant of the structure shown in FIG. 5.

FIG. 6 illustrates a variant application of the device shown in FIG. 5. In this variant the skirt 11 of the valve guide 9 terminates in the form of a funnel substantially fitting flush with the tulip-shaped profile of the head 8 of the valve 1.

Figure 7:
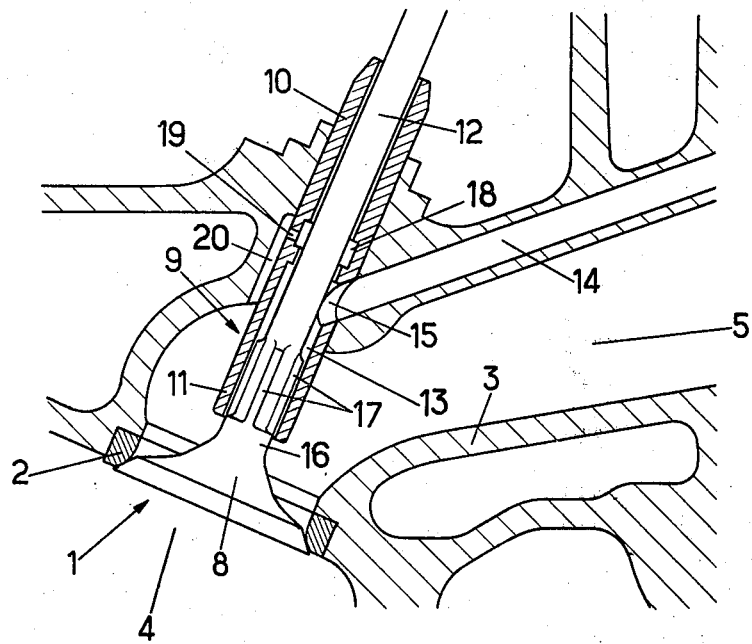
FIG. 7 is a view similar to FIG. 5 and illustrating a further embodiment of the invention with the valve shown in the closed position; and, FIG. 8 is a view similar to FIG. 7, with the valve being shown in the open position.
Figure 8:
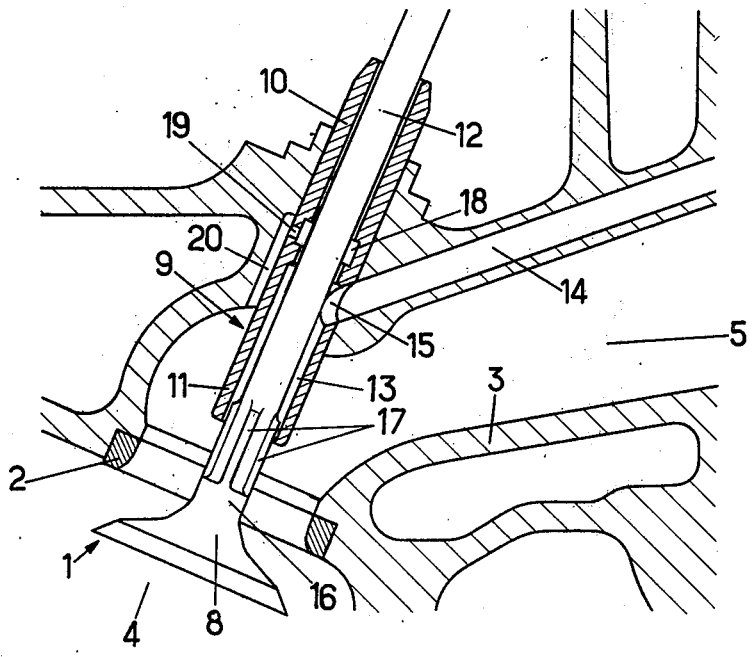

FIGS. 7 and 8 illustrate a fourth embodiment of the invention which is an improvement of the embodiment illustrated in FIG. 5, and in which the guide valve 9 is associated with a valve 1 comprising, at the level of the connecting zone between its head 8 and stem 12, a cylindrical shoulder 16 continued on the side of the stem 12 by an assembly of ribs 17. The cylindrical shoulder 16, whose outside diameter is slightly smaller than the inside diameter of the skirt 11 of the valve guide 9, substantially closes the free end of the skirt in the closure position of the valve 1, with the ribs 17 enabling the valve 1 to be guided into the free end of the skirt 11 while allowing the fluid to flow, in the open position of the valve 1. This configuration of the valve avoids the necessity for contact of the tulip-shaped part of the head of the valve 1 with the free end of the skirt 11 of the valve guide 9 in order to close off that end. Such contact is therefore prevented from taking place before the valve 1 is resting on its seat 2 and therefore from preventing the valve from closing completely.

The cylindrical shoulder 16 and the ribs 17 adjacent thereto can be made directly, as shown in the drawings, on the valve during its manufacture. However, such elements can also be formed by a ring disposed on the stem 12 of the valve at the level of its connection with the valve head 8.

FIGS. 7 and 8 also illustrate a leakage labyrinth adapted to prevent the injected fluid (which tends to escape, under the effect of the pressure, along the stem 12 of the valve, more particularly during the periods when the skirt 11 is closed by the valve 1) from forcing the lubricant between the valve stem and the body 10 of the guide 9 towards the top of the cylinder head, with the consequent risk that the valve will be inadequately lubricated and seize up. The leakage labyrinth comprises an annular groove 18 disposed in the bore of the body 10 of the valve guide 9 through which the valve stem 12 extends, slightly above the top end of the skirt 11. The groove 18 is adapted to collect that fraction of fluid which tends to escape along the valve stem 12 and to direct such fraction into the corresponding pipe 5 of the engine by means of a radial channel 19, formed in the body 10 of the valve guide and bringing the groove 18 into communication with a second longitudinal channel 20 formed in the surface of the bore, in the cylinder head 3, which receives the guide 9, the channel 20 discharging into the engine pipe 5.

In all the embodiments disclosed hereinbefore, the injection of air into the exhaust pipe 5 is therefore directly initiated by the raising of the valve 1 and takes place solely during the exhaust phase, corresponding to the opening period of the valve.

Moreover, the compressed air is injected in counter-flow with the exhaust gas flow, causing a mixing which encourages satisfactory homogeneity in the after-combustion mixture; such injection also has the advantage of cooling the valve by heat exchange, this very appreciably extending valve life.

It is not necessary, or even desirable, to suppress completely the flow of compressed air in the exhaust pipe 5 when the exhaust valve 1 is in the closed position, since a slight clearance causing a small leakage must be left between the free end of the injection conduit 7, 13 and the portion of the zone connecting the head 8 to the stem 12 of the valve 1, so that the air pressure does not tend to repel the valve 1, against the force of its return system, and therefore the valve 1 bears correctly against its seat 2. This not only facilitates manufacture, since the injection conduit has to be machined with less precision, but it also enables the exhaust valve 1 to be permanently cooled, whatever the operating cycle of the engine may be.

Clearly, various changes, improvements or additions might be made to the embodiments of the invention described hereinbefore, or certain elements might be replaced by equivalent elements, without altering the general nature of the invention. Accordingly, while I have disclosed and described preferred embodiments of my invention, I wish it understood that I do not intend to be restricted solely thereto, but that I do intend to include all embodiments thereof which would be apparent to one skilled in the art and which come within the spirit and scope of my invention.

I claim:

1. A device for injecting gaseous fluid at the level of a valve of an internal combustion engine, said device being of the type including an injection conduit having an outlet discharging into the opening zone of the valve, the outlet being substantially closed by a portion of the valve adjacent the head thereof when the valve is in the closed position and open when the valve is in the opened position whereby fluid is injected into the opening zone of the valve only when the valve is in the open position, the improvement comprising, a valve guide having a body portion which is adapted to guide a conventionally constructed valve and an axially extending hollow skirt portion which is unitary with such body, the inner part of said hollow skirt being concentric with the valve stem and cooperating therewith to form the fluid injection conduit, the free end of said skirt portion terminating adjacent and being substantially closed by the enlarged portion of said valve in the area of the zone connecting the valve stem and valve head when said valve is in the closure position, and a traverse aperture formed in said valve guide to admit fluid under pressure into said skirt, so as then to channel the fluid along the valve stem inside the conduit formed by the skirt and then inject the fluid when the valve is in the open position.

2. A fluid injecting device as set forth in claim 1, wherein said valve comprises, at the level of the connecting zone between its head and stem, a cylindrical shoulder continued on the valve stem side by an assembly of ribs, the cylindrical shoulder being adapted to close the free end of said skirt of the valve guide, and the assembly of ribs being adapted to guide the valve stem in its skirt while allowing the injected fluid to flow, in the open position of the valve.

3. A fluid injecting device as set forth in claim 2, wherein said cylindrical shoulder and ribs adjacent thereto are internally formed on the valve when it is shaped.

4. A fluid injecting device as set forth in claim 2, wherein said cylindrical shoulder and the ribs adjacent thereto are formed by a ring applied to the valve stem.

5. A fluid injecting device as set forth in claim 1, further comprising channel means forming a leakage labyrinth inside the valve guide body at a position slightly above the upper part of the skirt, said labyrinth being adapted to collect the fraction of fluid which tends to escape along the valve stem towards the top of the cylinder head and to channel such fraction laterally of the valve guide in the direction of the corresponding engine pipes.

6. A fluid injecting device as set forth in claim 1, wherein said conduit outlet is positioned relative to said valve to provide a slight clearance therebetween producing a small leakage path between the free end of the injection conduit and the portion of the zone connecting the head of the stem of the valve during the closure phase thereof.

7. A fluid injecting device as set forth in claim 1, wherein said valve guide skirt terminates in the form of a funnel substantially fitting over the tulip-shaped profile of the valve in the closure position.

* * * * *